US012780184B2

(12) United States Patent
Leitermann et al.

(10) Patent No.: US 12,780,184 B2
(45) Date of Patent: Nov. 3, 2026

(54) SYSTEMS AND METHODS FOR PLANNING AND UPDATING A VEHICLE'S TRAJECTORY

(71) Applicant: Motional AD LLC, Boston, MA (US)

(72) Inventors: Olivia Leitermann, Cambridge, MA (US); Eryk Brian Nice, Medford, MA (US)

(73) Assignee: Motional AD LLC, Boston, MA (US)

( * ) Notice: Subject to any disclaimer, the term of this patent is extended or adjusted under 35 U.S.C. 154(b) by 164 days.

(21) Appl. No.: 18/375,325

(22) Filed: Sep. 29, 2023

(65) Prior Publication Data

US 2024/0025396 A1 Jan. 25, 2024

Related U.S. Application Data

(63) Continuation of application No. 16/865,485, filed on May 4, 2020, now Pat. No. 11,772,638.

(Continued)

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 60/0011* (2020.02); *B60W 60/0027* (2020.02); *B60W 60/00272* (2020.02); *B60W 60/00276* (2020.02); *G05D 1/0214* (2013.01); *B60W 2554/4041* (2020.02);
(Continued)

(58) Field of Classification Search
CPC ............ B60W 30/09; B60W 30/0956; B60W 60/0011; B60W 60/0027; B60W 60/00272; B60W 60/00276
See application file for complete search history.

(56) References Cited

U.S. PATENT DOCUMENTS

| | | | |
|---|---|---|---|
| 5,801,943 | A | 9/1998 | Nasburg |
| 6,374,155 | B1 | 4/2002 | Wallach et al. |

(Continued)

FOREIGN PATENT DOCUMENTS

| | | |
|---|---|---|
| CN | 1399734 | 2/2003 |
| CN | 101641717 | 2/2010 |

(Continued)

OTHER PUBLICATIONS

[No Author Listed] "SAE International: Surface Vehicle Recommended Practice," J3016, Sep. 30, 2016, 30 pages.

(Continued)

*Primary Examiner* — Anshul Sood
(74) *Attorney, Agent, or Firm* — Fish & Richardson P.C.

(57) ABSTRACT

Techniques are provided for generating a driving trajectory for a vehicle while the vehicle is blocked (e.g., the sensor of the vehicle have detected an object results in the vehicle being unable to move) by an object (e.g., another vehicle, bicycle, or a pedestrian) and executing the driving trajectory when the vehicle becomes unblocked. In addition, techniques are provided for updating a portion of a driving trajectory of a vehicle based on a determination that an object will cross a segment of the current driving trajectory at a later point, without recalculating the whole trajectory.

16 Claims, 17 Drawing Sheets

Related U.S. Application Data

(60) Provisional application No. 62/844,689, filed on May 7, 2019.

(51) Int. Cl.
*B60W 60/00* (2020.01)
*G05D 1/00* (2006.01)

(52) U.S. Cl.
CPC ............... *B60W 2554/4042* (2020.02); *B60W 2554/4043* (2020.02)

(56) References Cited

U.S. PATENT DOCUMENTS

| | | | |
|---|---|---|---|
| 8,996,224 B1 | 3/2015 | Herbach et al. | |
| 9,248,834 B1 | 2/2016 | Ferguson et al. | |
| 10,303,178 B1 | 5/2019 | Gutmann | |
| 10,889,295 B2 | 1/2021 | Paris | |
| 11,772,638 B2 | 10/2023 | Leitermann et al. | |
| 2002/0036584 A1 | 3/2002 | Jocoy et al. | |
| 2013/0293395 A1 | 11/2013 | Ohama et al. | |
| 2015/0286219 A1 | 10/2015 | Reichel et al. | |
| 2017/0084177 A1* | 3/2017 | Matsuoka | G08G 1/163 |
| 2018/0032079 A1 | 2/2018 | Nishi | |
| 2018/0196437 A1 | 7/2018 | Herbach | |
| 2018/0244275 A1 | 8/2018 | Bremkens et al. | |
| 2018/0326982 A1 | 11/2018 | Paris et al. | |
| 2019/0118810 A1 | 4/2019 | Paris | |
| 2019/0235499 A1* | 8/2019 | Kazemi | G01S 17/931 |
| 2019/0375430 A1* | 12/2019 | Emura | G08G 1/00 |
| 2020/0108825 A1* | 4/2020 | Kim | G06V 20/58 |
| 2020/0174481 A1* | 6/2020 | Van Heukelom | G01C 21/3407 |
| 2020/0353917 A1 | 11/2020 | Leitermann et al. | |
| 2021/0191404 A1 | 6/2021 | Blake et al. | |
| 2021/0261122 A1* | 8/2021 | Packer | B60W 30/0956 |
| 2021/0287536 A1 | 9/2021 | Siltanen | |

FOREIGN PATENT DOCUMENTS

| | | |
|---|---|---|
| CN | 104753343 | 7/2015 |
| CN | 105806354 | 7/2016 |
| CN | 106323308 | 1/2017 |
| CN | 106428009 | 2/2017 |
| CN | 107664993 | 2/2018 |
| CN | 108196456 | 6/2018 |
| CN | 108292134 | 7/2018 |
| CN | 108475057 | 8/2018 |
| CN | 109489675 | 3/2019 |
| CN | 109641594 | 4/2019 |
| DE | 102012021282 | 4/2014 |
| DE | 102014111023 | 2/2016 |
| DE | 102016203086 | 8/2017 |
| DE | 102017217056 | 3/2019 |
| KR | 2018-0053142 | 5/2018 |
| KR | 2018-0088789 | 1/2020 |
| WO | WO 2018185758 | 10/2018 |
| WO | WO 2019231455 | 12/2019 |
| WO | WO 2019231456 | 12/2019 |

OTHER PUBLICATIONS

Jiang et a., "Spatial-temporal Trajectory Optimization Control System for Connected and Automated Vehicles at Signalized Intersections," Science Technology and Engineering, Jul. 2018, 18(20):162-168 (with English abstract).

Zhang et al., "Vehicle Motion Trajectory Prediction Method Based on Probability Statistics", Journal of Military Transportation University, Aug. 2017, 19(8):41-46 (Abstract with English translation only).

* cited by examiner

SYSTEMS AND METHODS FOR PLANNING AND UPDATING A VEHICLE'S TRAJECTORY

CROSS-REFERENCE TO RELATED APPLICATIONS

This application is a continuation of and claims priority to U.S. patent application Ser. No. 16/865,485, filed May 4, 2020, which claims priority to U.S. Provisional Application Ser. No. 62/844,689, filed on May 7, 2019. The disclosure of the prior applications are considered part of the disclosure of this application, and are incorporated in their entirety into this application.

FIELD OF THE INVENTION

This description relates to systems and methods for planning and updating a vehicle's trajectory.

BACKGROUND

Autonomous vehicles have benefits over human-drive vehicles, e.g., reducing road fatalities, traffic congestion, parking congestion, and fuel efficiency. In making driving decisions, typical autonomous vehicle systems take account of objects—such as other vehicles and obstacles—of the surrounding environment that the autonomous vehicle system knows are in the environment of the vehicle by utilizing sensor data. However, challenges exist where the vehicle's systems need to predict future movement based on sensor data presently available.

SUMMARY

Techniques are provided for generating a driving trajectory for a vehicle while the vehicle is blocked (e.g., the sensor of the vehicle have detected an object results in the vehicle being unable to move) by an object (e.g., another vehicle, bicycle, or a pedestrian) and executing the driving trajectory when the vehicle becomes unblocked. In addition, techniques are provided for updating a portion of a driving trajectory of a vehicle based on a determination that an object will cross a segment of the current driving trajectory at a later point, without recalculating the whole trajectory.

In general, one innovative aspect of the subject matter described in this specification can be embodied in methods that include the actions of retrieving sensor data representing objects in an environment of a vehicle, and determining that the vehicle is blocked by one or more of the objects. Further actions include determining, based on the sensor data and a timestamp of the sensor data, probable locations for at least some of the objects, generating, while the vehicle is blocked and based on the probable locations of at least some of the objects, one or more operational commands for the vehicle, and executing the one or more operational commands by a control circuit of the vehicle, where executing the operational commands includes maneuvering the vehicle along a path that is unblocked by the object.

These, and other aspects, features, and implementations have one or more of the following advantages. Route planning can be performed while the vehicle is not moving, giving the system more time to process information. In addition, the system has more time to update any route based on changes in conditions while the vehicle is blocked. Some other advantages include not having to update a whole route based on a change in a segment of a route. Instead only that portion of the route can be updated. This approach saves processing resources and enable more efficient route planning.

These and other aspects, features, and embodiments can be expressed as methods, apparatus, systems, components, program products, means or steps for performing a function, and in other ways.

These and other aspects, features, and embodiments will become apparent from the following descriptions, including the claims.

DETAILED DESCRIPTION

Figure 1:
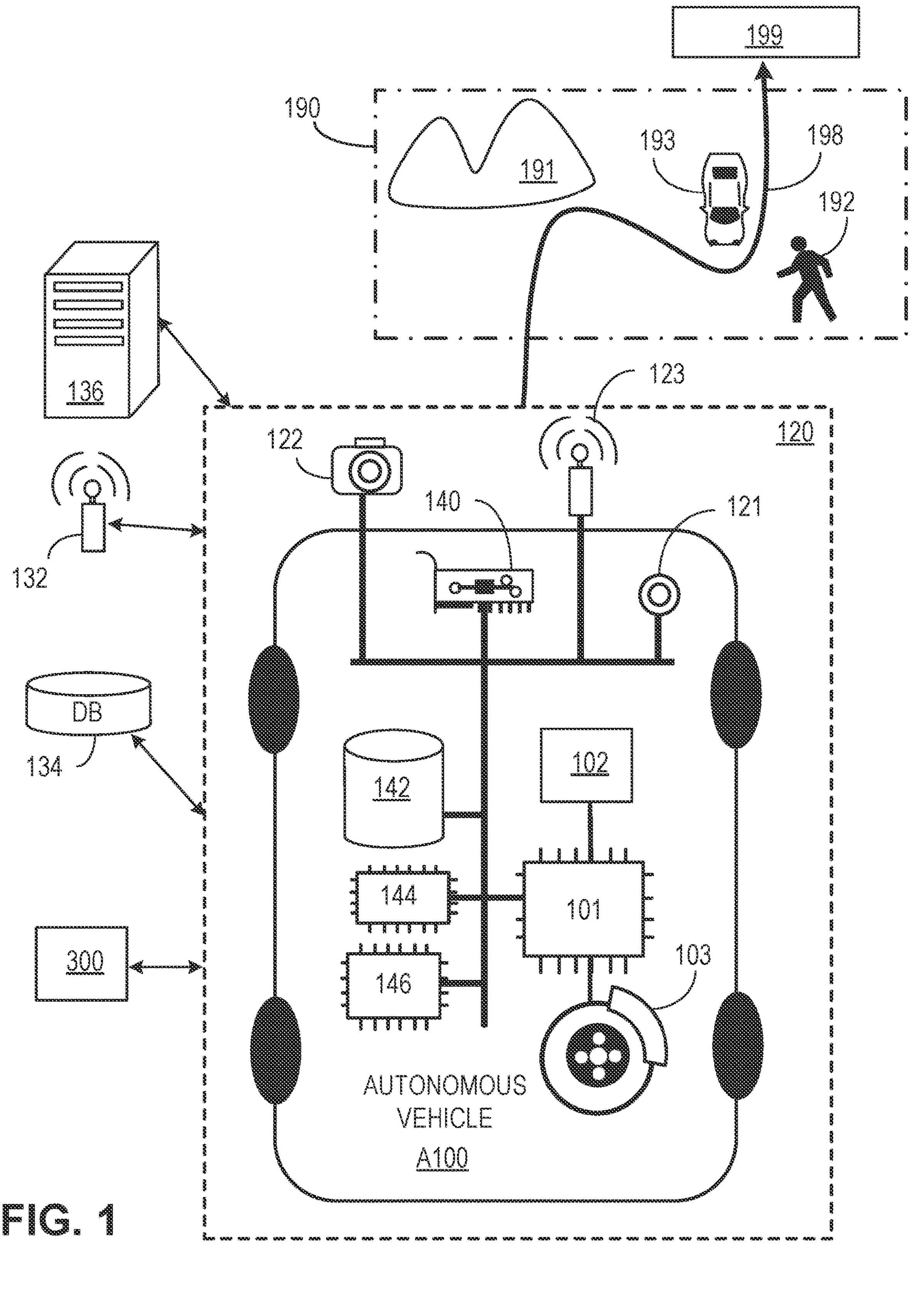
FIG. 1 shows an example of an autonomous vehicle having autonomous capability.

Techniques are provided for generating a driving trajectory for a vehicle while the vehicle is blocked (e.g., the sensor of the vehicle have detected an object results in the vehicle being unable to move) by an object (e.g., another vehicle, bicycle, or a pedestrian) and executing the driving trajectory when the vehicle becomes unblocked. Furthermore, techniques are provided for updating a portion of a driving trajectory of a vehicle based on a probability that an object will cross a segment of the current driving trajectory at a later point, e.g., without recalculating the whole trajectory.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Motion Planning for a Blocked Vehicle
8. Partial Trajectory Update

SYSTEM OVERVIEW

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. As referred to herein, the term operational command refers to an executable instruction (or set of instructions) that instructs a vehicle to perform an action (e.g., driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
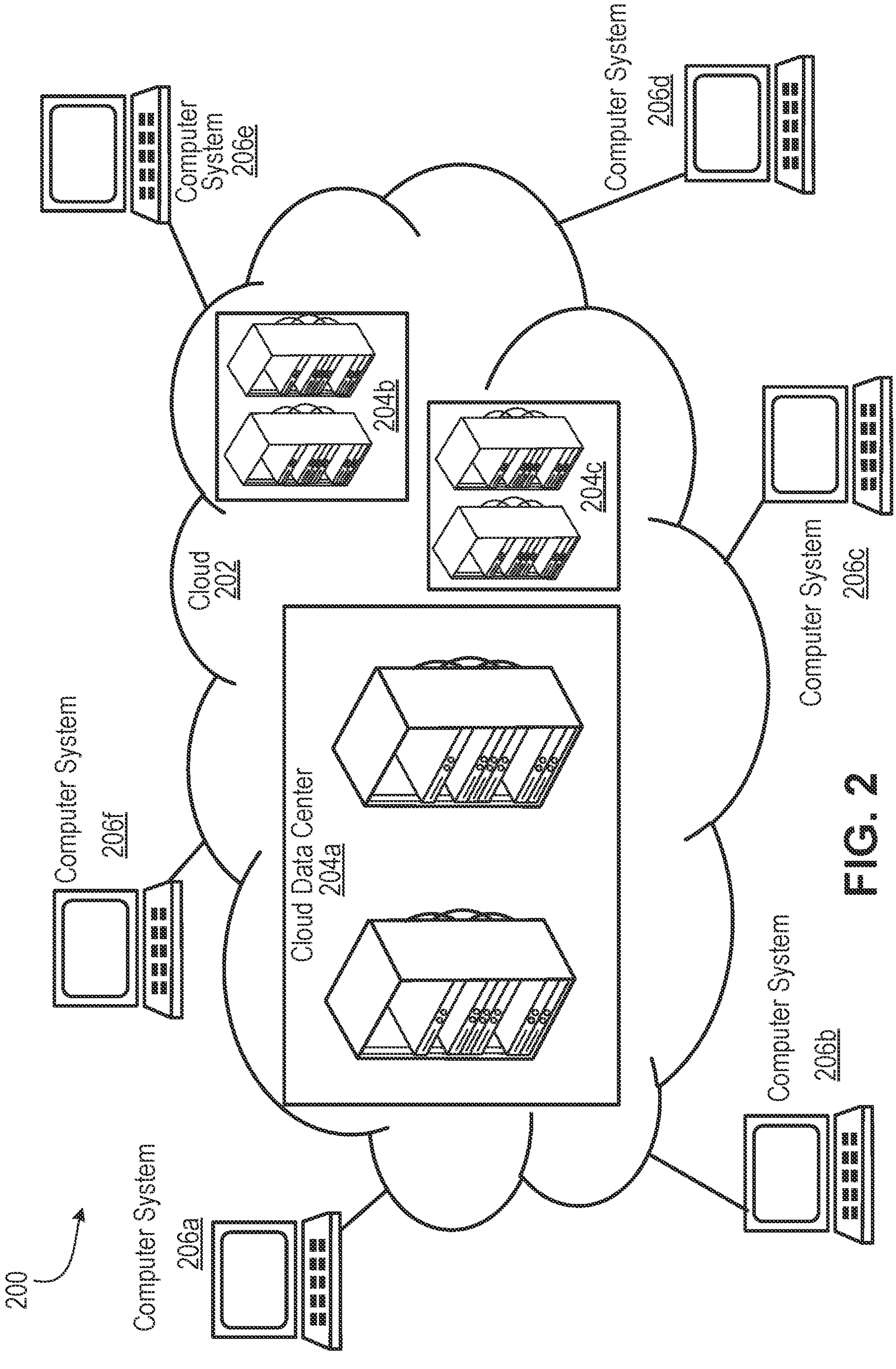
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204*a*, 204*b*, and 204*c* that are interconnected through the cloud 202. Data centers 204*a*, 204*b*, and 204*c* provide cloud computing services to computer systems 206*a*, 206*b*, 206*c*, 206*d*, 206*e*, and 206*f* connected to cloud 202.

The cloud computing environment 200 includes one or more cloud data centers. In general, a cloud data center, for example the cloud data center 204*a* shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204*a* has many computing systems distributed through many racks.

The cloud 202 includes cloud data centers 204*a*, 204*b*, and 204*c* along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206*a-f* or cloud computing services consumers are connected to the cloud 202 through network links and network adapters. In an embodiment, the computing systems 206*a-f* are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206*a-f* are implemented in or as a part of other systems.

Figure 3:
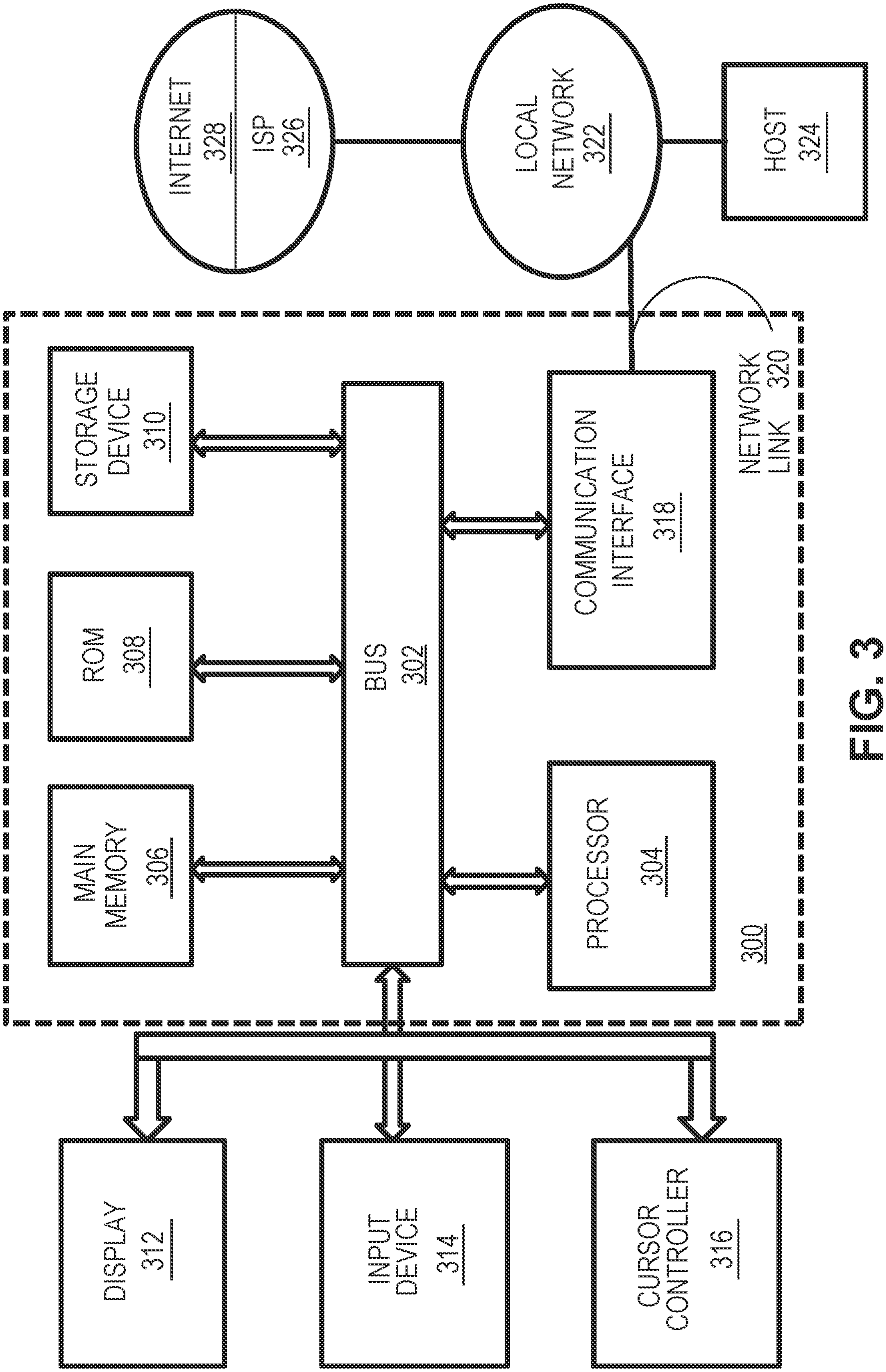
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
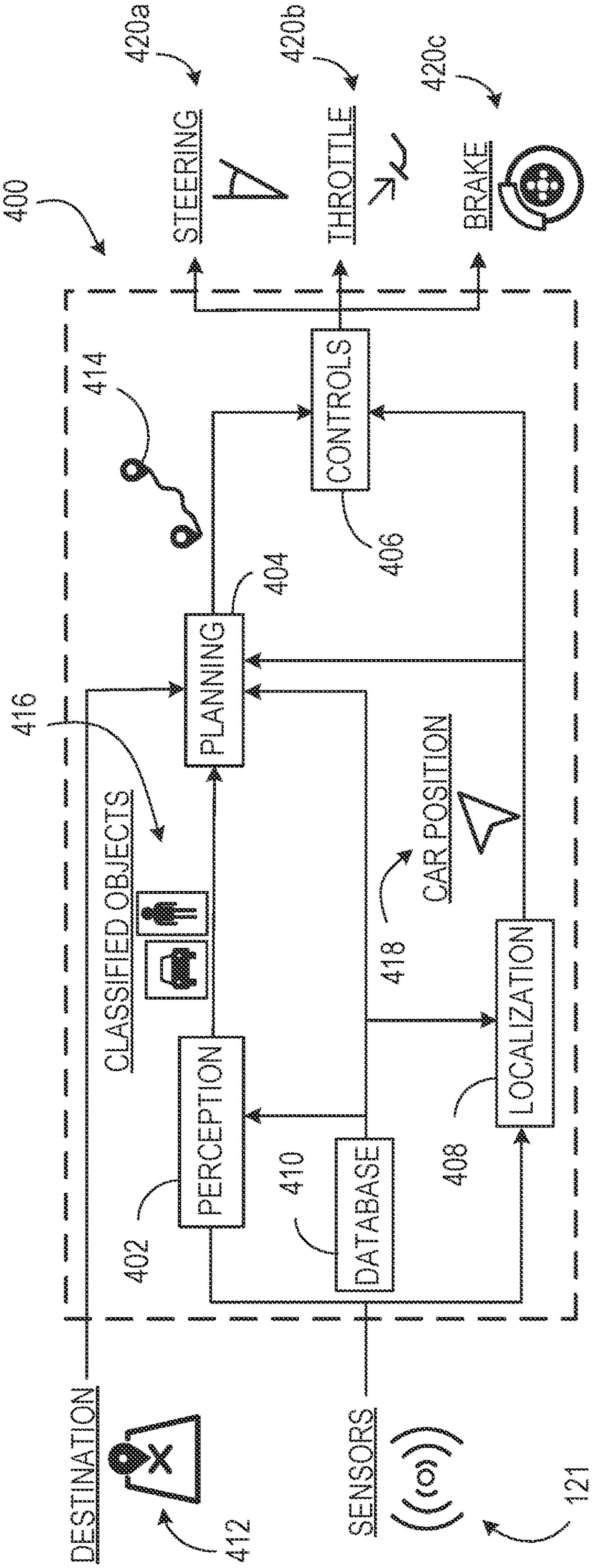
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420*a-c* (e.g., steering, throttling, braking, ignition) of the AV in a manner that will cause the AV 100 to travel the trajectory 414 to the destination 412. For example, if the trajectory 414 includes a left turn, the control module 406 will operate the control functions 420*a-c* in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
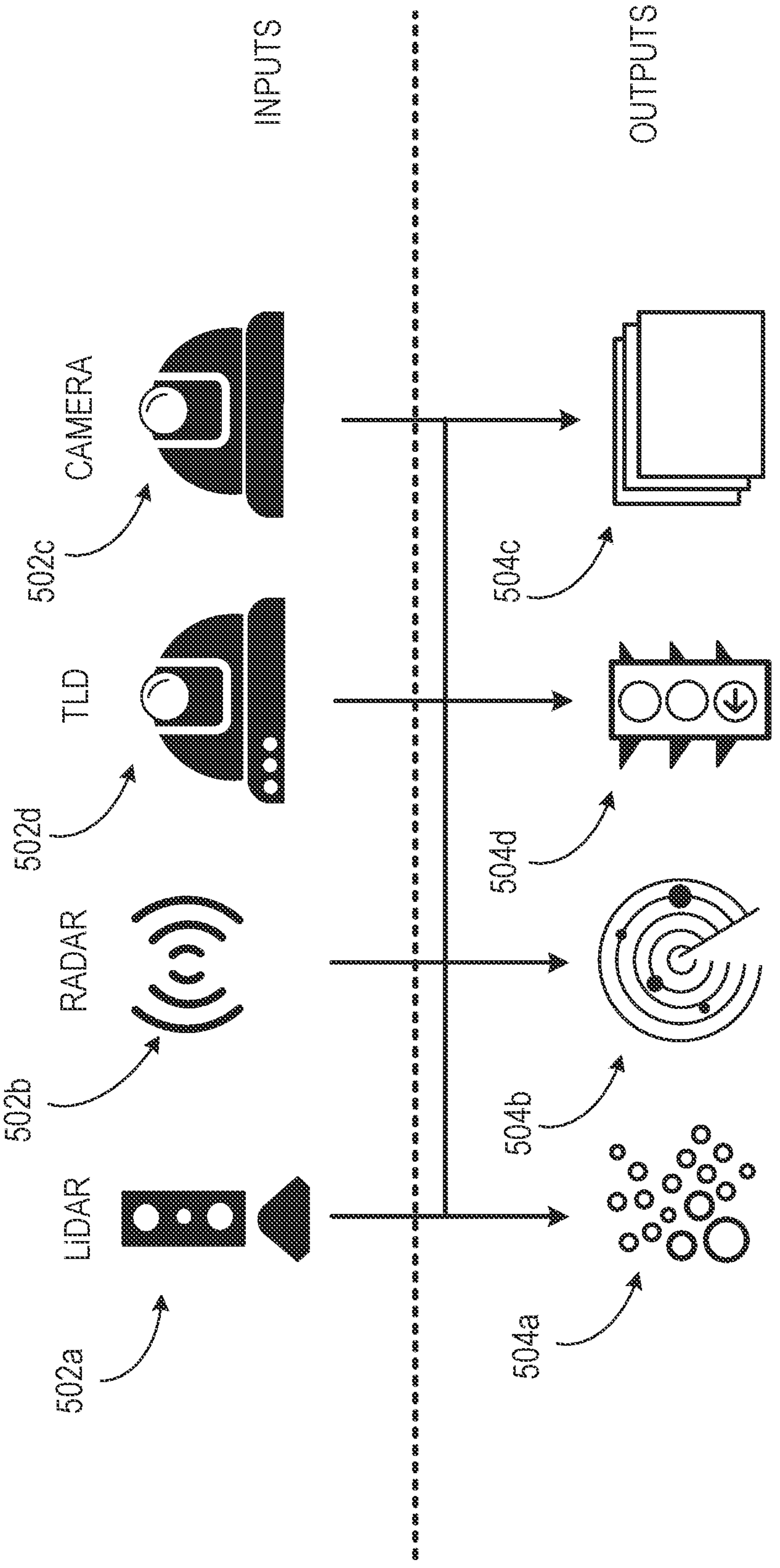
FIG. 5 shows an example of inputs and outputs that may be used by a perception module.

FIG. 5 shows an example of inputs 502*a-d* (e.g., sensors 121 shown in FIG. 1) and outputs 504*a-d* (e.g., sensor data)

that is used by the perception module 402 (FIG. 4). One input 502*a* is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as a point clouds) that are used to construct a representation of the environment 190.

Another input 502*b* is a RADAR system. RADAR is a technology that uses radio waves to obtain data about nearby physical objects. RADARs can obtain data about objects not within the line of sight of a LiDAR system. A RADAR system 502*b* produces RADAR data as output 504*b*. For example, RADAR data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual navigation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
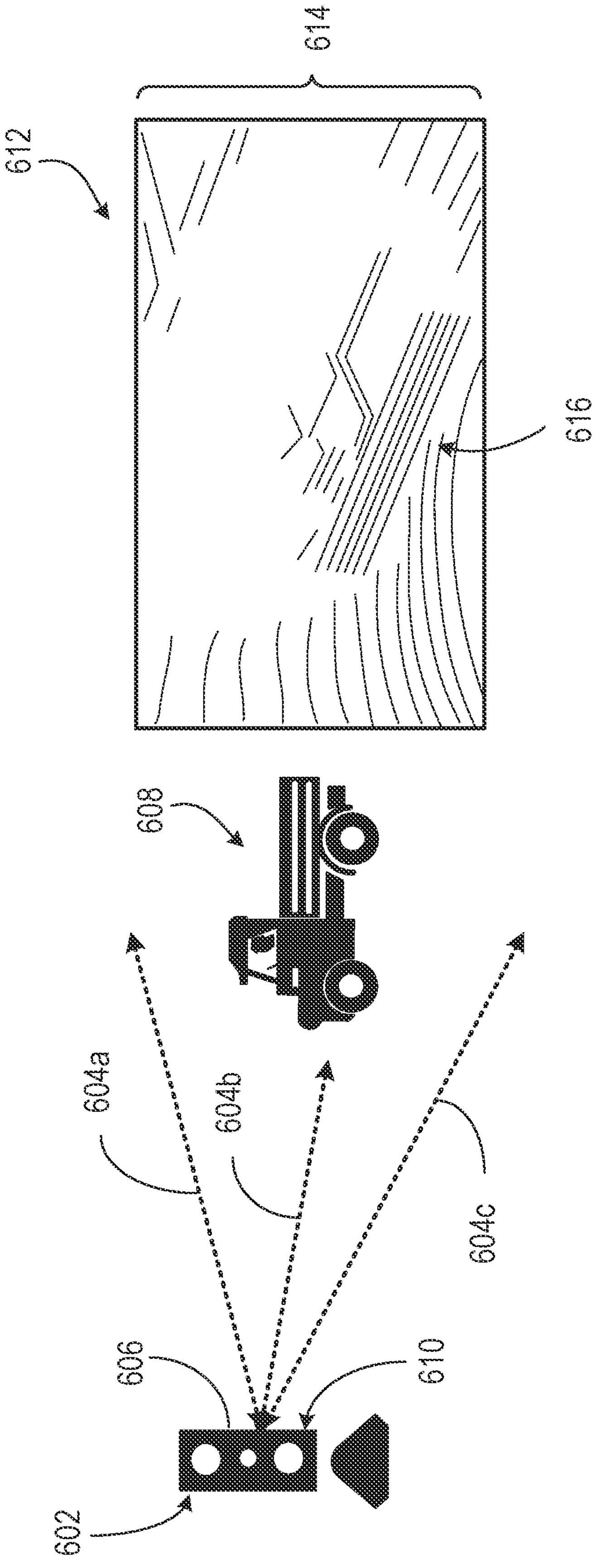
FIG. 6 shows an example of a LiDAR system.

FIG. 6 shows an example of a LiDAR system 602 (e.g., the input 502*a* shown in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
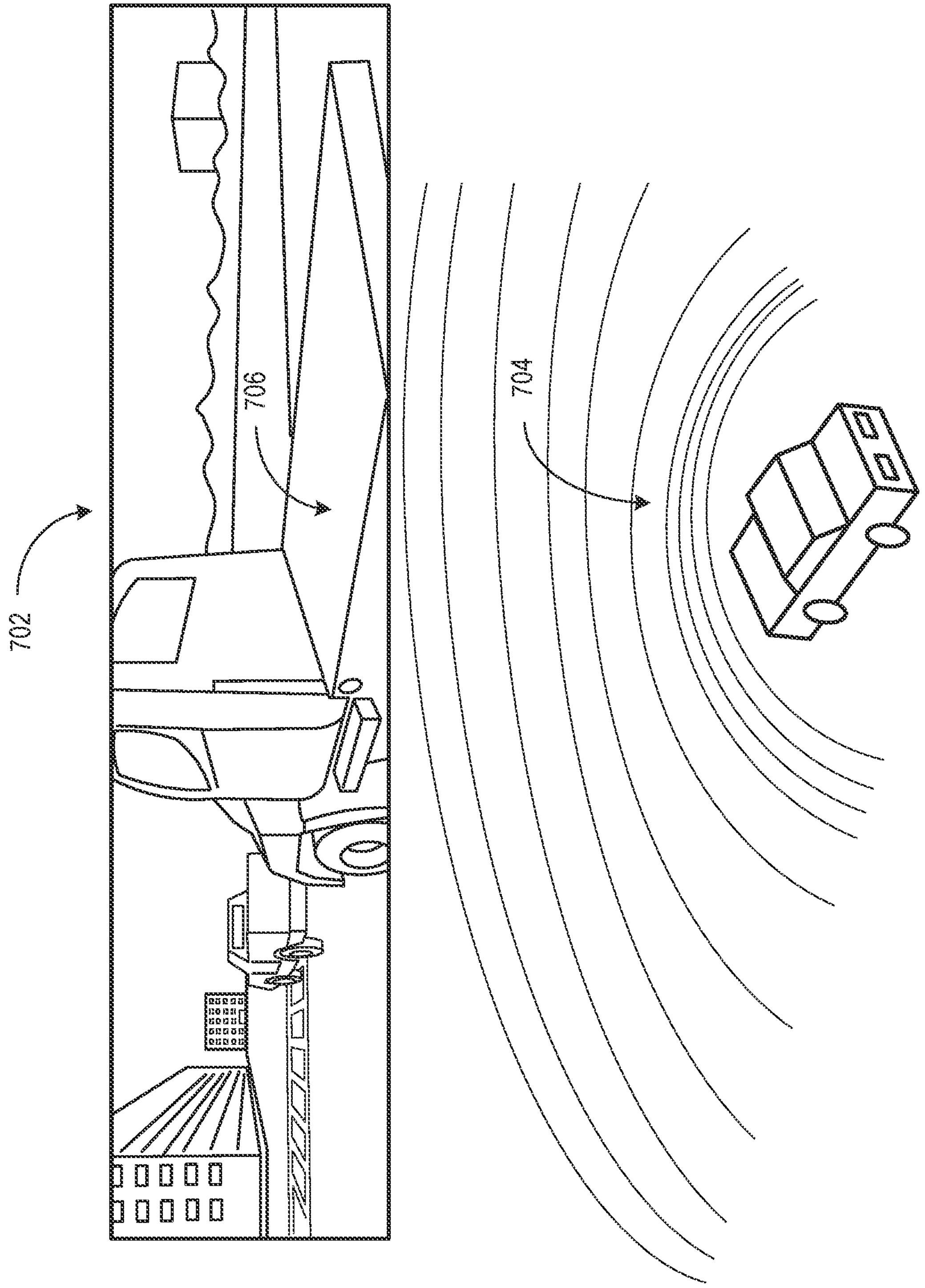
FIG. 7 shows the LiDAR system in operation.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
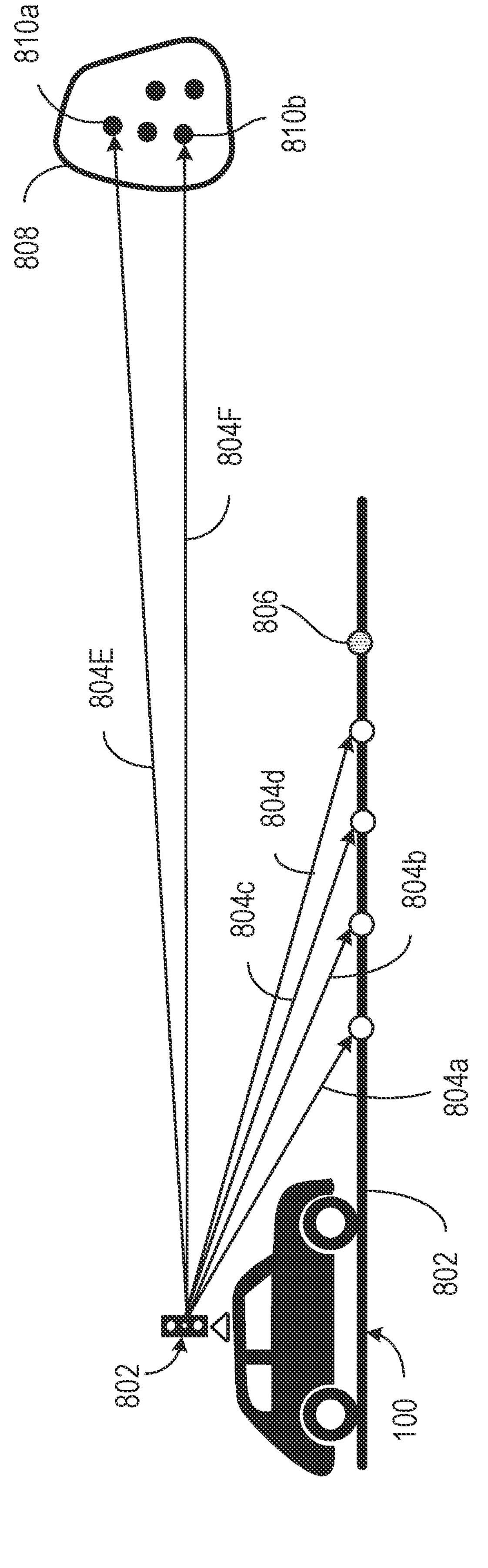
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
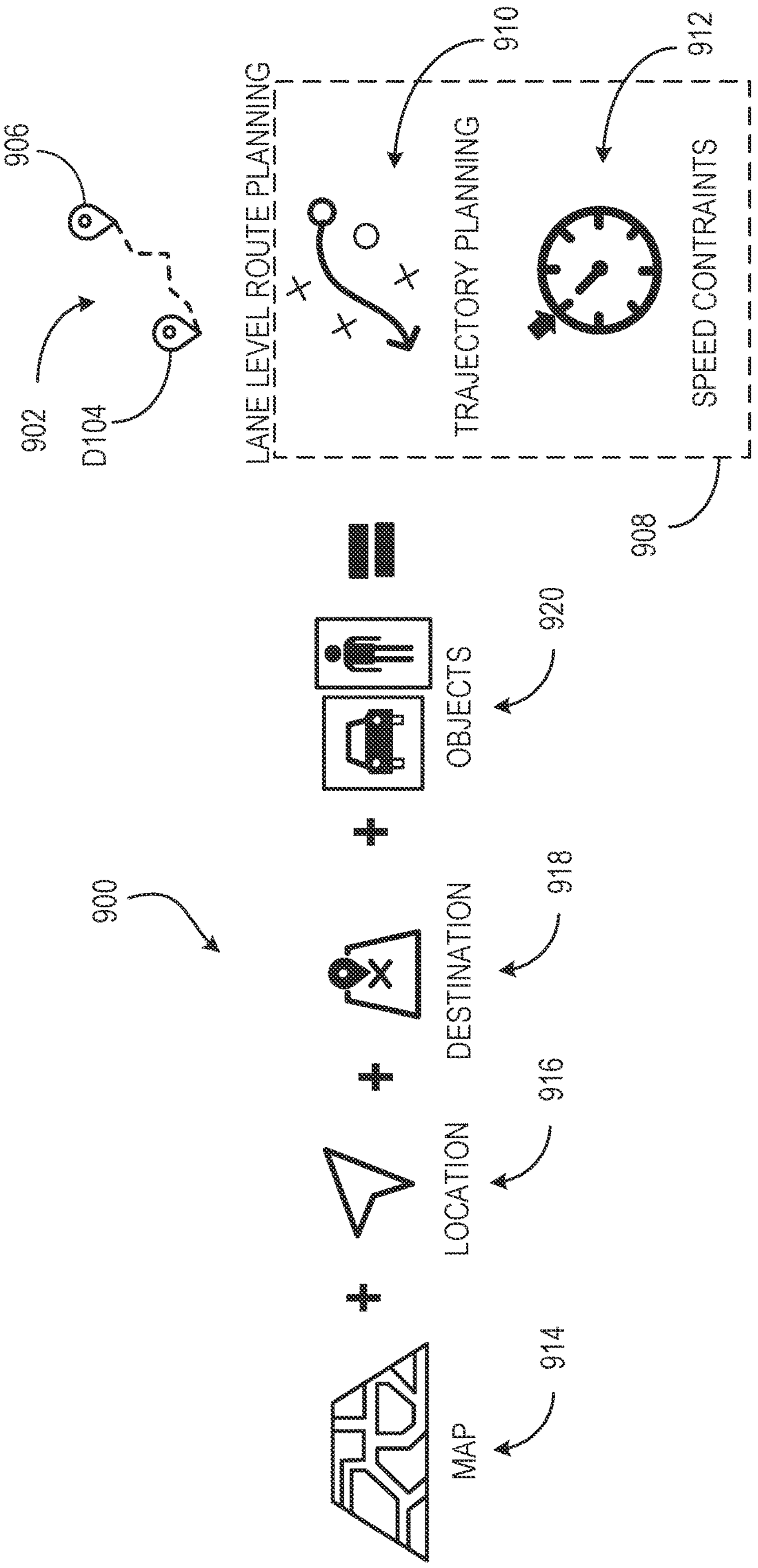
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
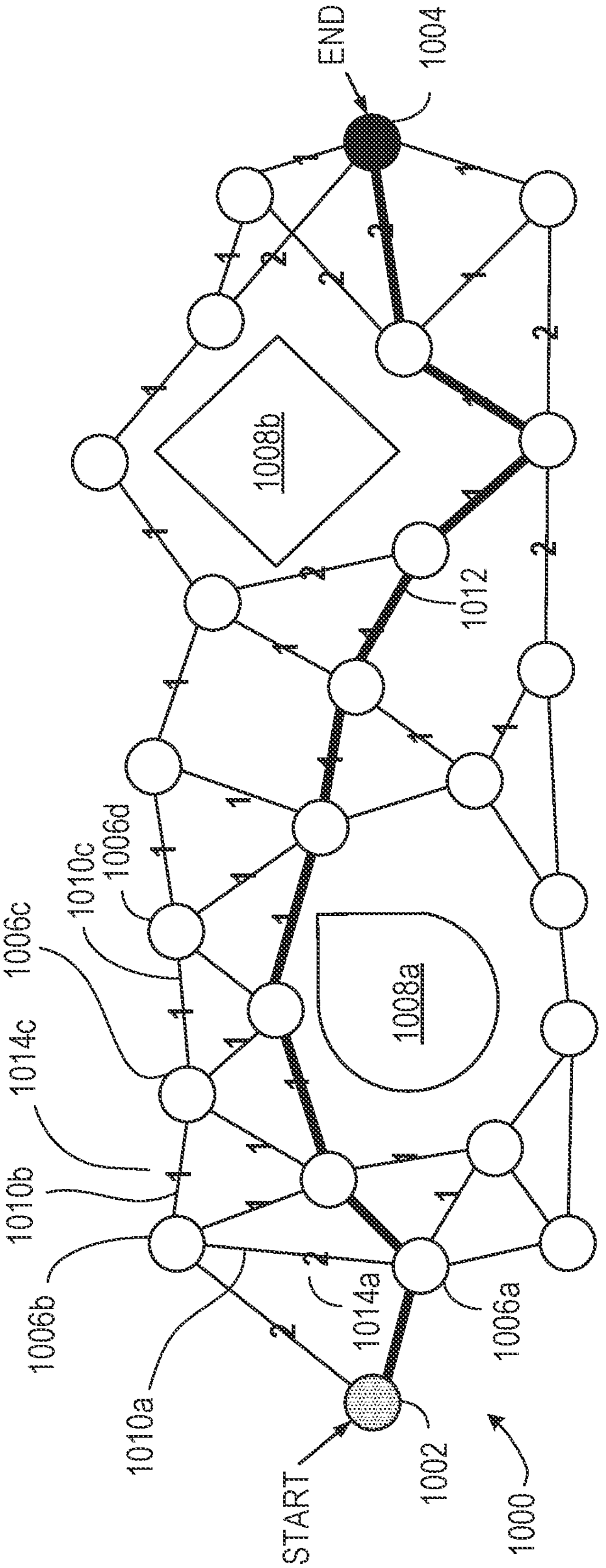
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006*a-d* represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are a static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
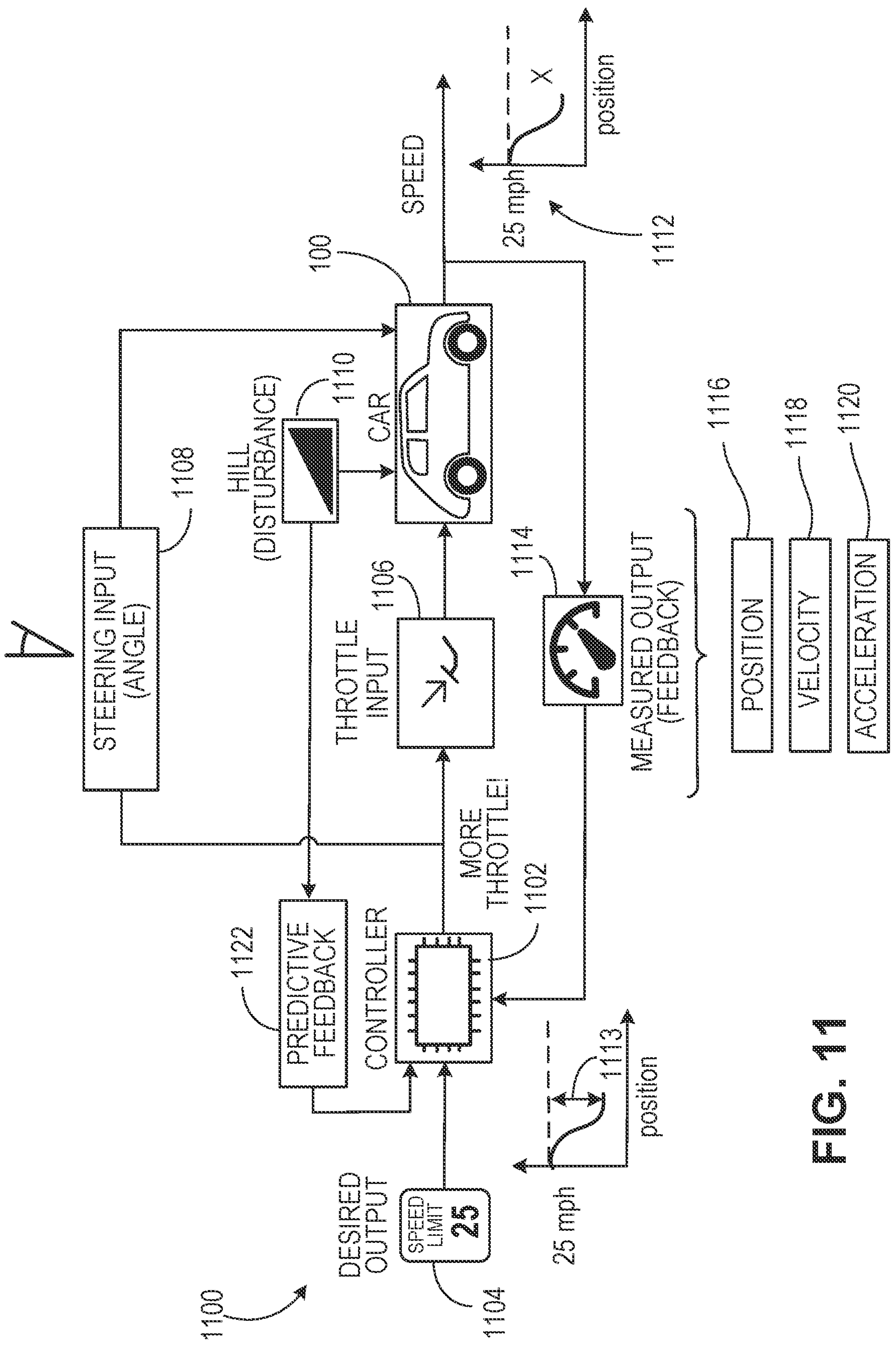
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
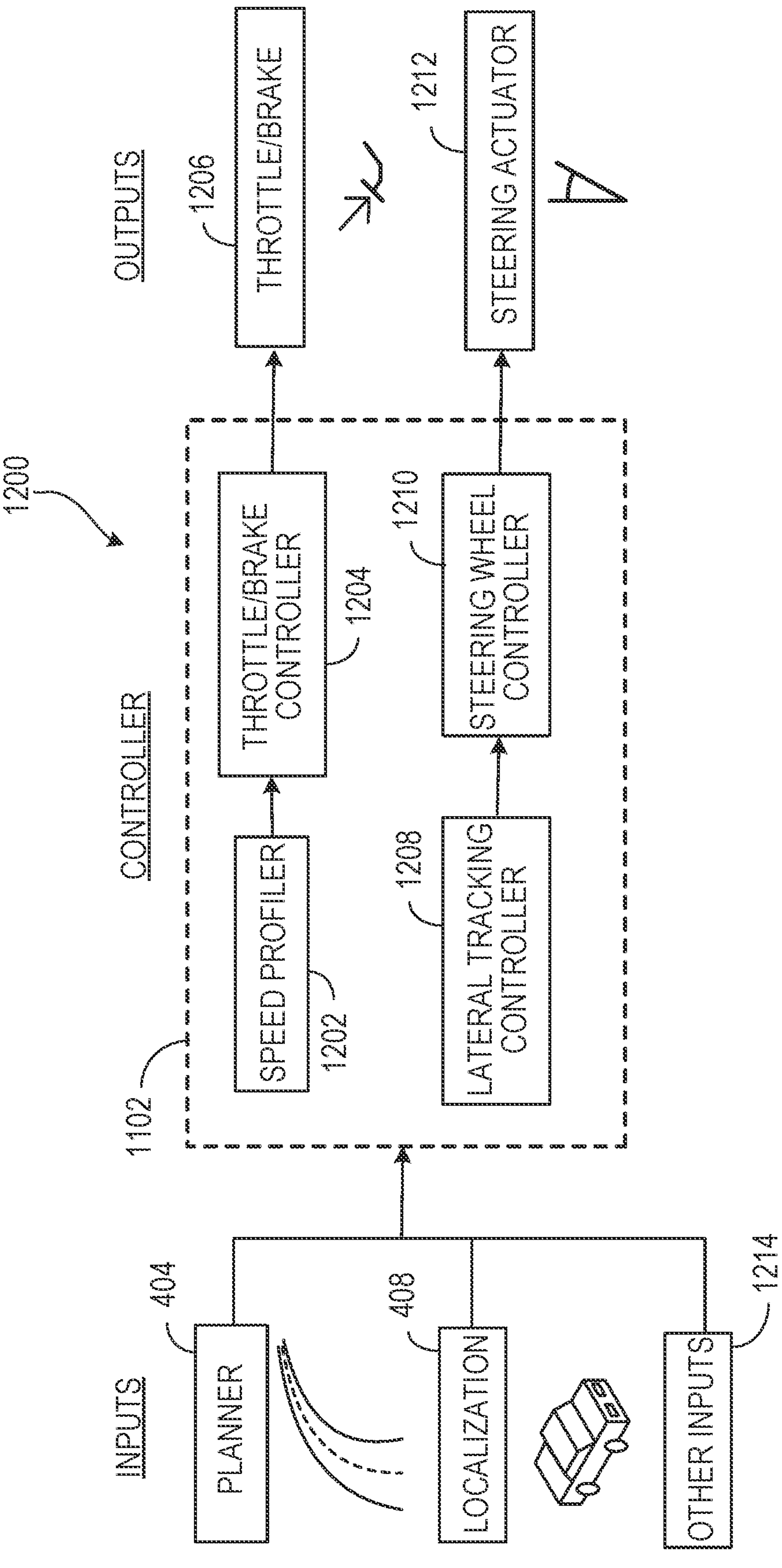
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Motion Planning for a Blocked Vehicle

Figure 13:
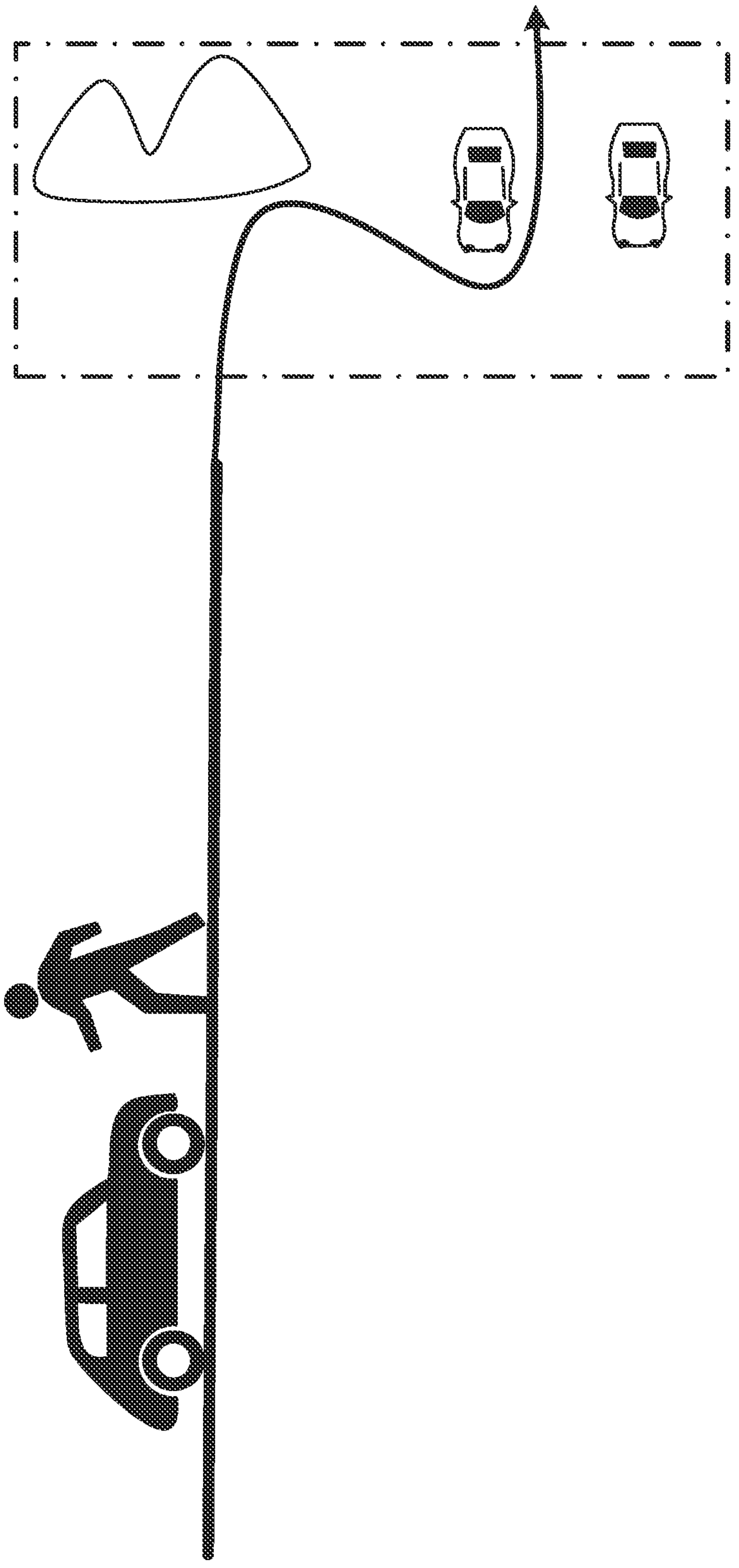
FIG. 13 illustrates a vehicle that is, while blocked by a pedestrian, uses its sensors to generate a trajectory for its movement when the vehicle becomes unblocked.

Techniques are will now be described in detail for generating a driving trajectory for a vehicle while the vehicle is blocked (e.g., the sensor of the vehicle have detected an object results in the vehicle being unable to move) by an object (e.g., another vehicle, bicycle, or a pedestrian) and executing the driving trajectory when the vehicle becomes unblocked. FIG. 13 illustrates a vehicle that is, while blocked by a pedestrian, uses data from its sensors to generate a trajectory for its movement to be executed when the vehicle becomes unblocked. For example, as the vehicle receives data from the sensors, the vehicle is able to generate a trajectory while the vehicle is unable to move due to the pedestrian. When the pedestrian moves out of the way, the vehicle is able to use the generated trajectory to proceed to its destination.

Figure 14:
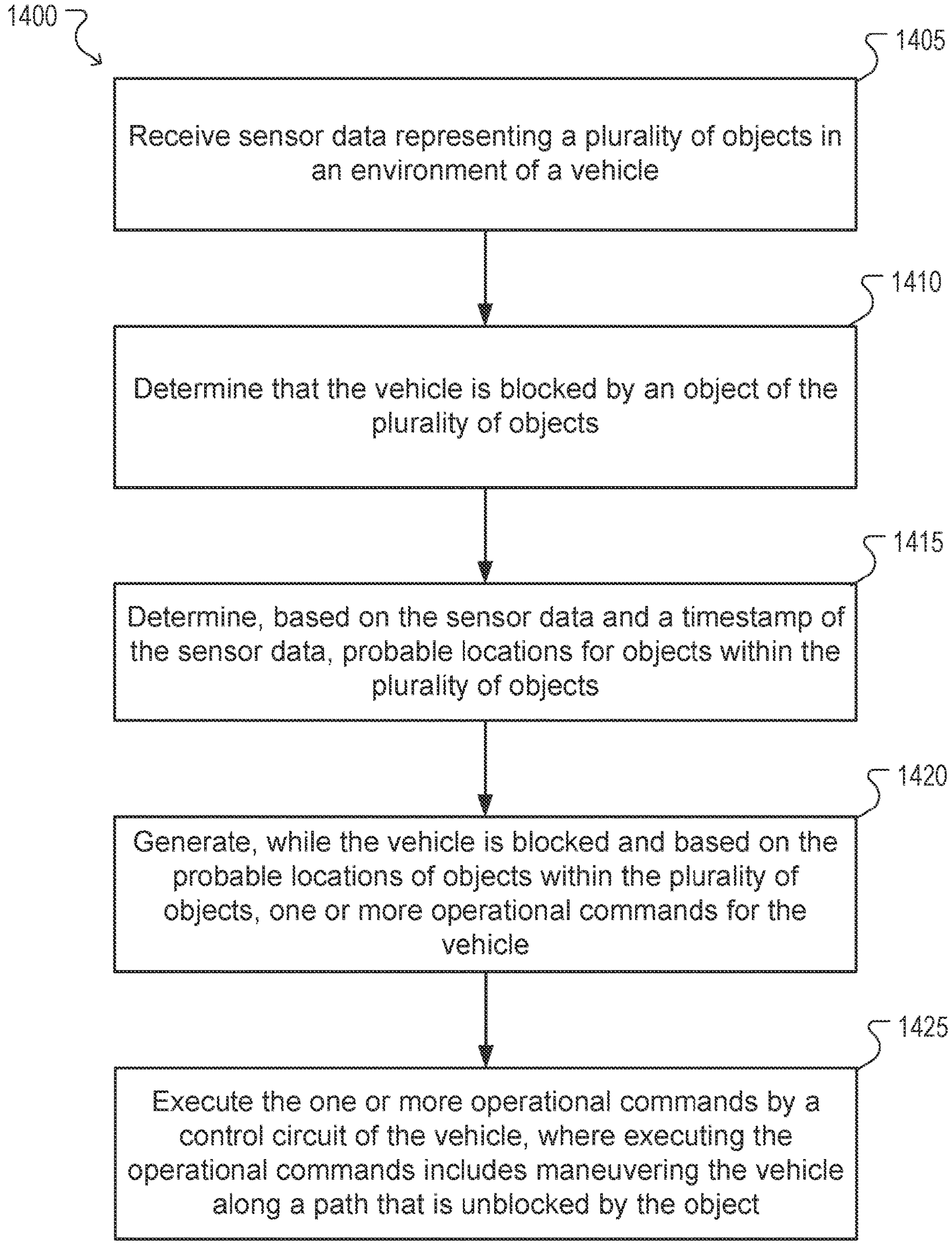
FIG. 14 illustrates a process for generating a trajectory for a vehicle while the vehicle is blocked by an object, and executing the trajectory when the vehicle becomes unblocked.

FIG. 14 illustrates a process 1400 for generating a trajectory for a vehicle while the vehicle is blocked by an object, and executing the trajectory when the vehicle becomes unblocked. As shown in block 1405, a processor (e.g., processor 146 as shown in FIG. 1) receives sensor data representing a plurality of objects in an environment of a vehicle. For example, as discussed above, the vehicle may be equipped with a Lidar, a radar, a camera or a combination of any of these (e.g., the sensors 121, 122, and/or 123 as shown in FIG. 1). Other sensors may also be included with the vehicle. That data may be acquired by the sensors and received by the processor. FIG. 4 demonstrates another example of how the sensor data may be received. As described in relation to FIG. 4, sensors 121 may receive collected data about the environment around the vehicle and feed that information into database 410. The perception module 402 (as shown in FIG. 4) uses the sensor data from the database to identify objects in the environment. The perception module 402 (as shown in FIG. 4) also determines velocity of those objects (e.g., by analyzing sensor data).

In an embodiment, the processor also identifies any objects in the path of the vehicle and, in some instances, their distance from the vehicle. Specifically, as shown in block 1410, the processor determines that the vehicle is blocked by an object of the plurality of objects. In an embodiment, the processor 146 determines, based on the data received from the sensors (e.g., the sensors 121, 122, and/or 123 as shown in FIG. 1) that there is an object (e.g., another vehicle, pedestrian, bicycle, or another object) in front of the vehicle that is blocking the vehicle (i.e., the vehicle cannot move until the object moves out of the way). In another embodiment, the perception module 402 (as shown in FIG. 4) determines, based on the sensor data in the database 410 (as shown in FIG. 4) that the vehicle is blocked by one or more of the objects.

As shown in block 1415, the processor (e.g., the processor 146 as shown in FIG. 1) determines, based on the sensor data and a timestamp of the sensor data, probable locations for objects within the plurality of objects. In an embodiment, the processor retrieves from data storage (e.g., the data storage 142 as shown in FIG. 1) sensor data that includes object locations, object velocities and a timestamp of the data. In some instances, the processor uses the location of each object and the timestamp of the data as a starting time and location and calculate, based on the velocity, locations of the objects at a future time. In an embodiment, the processor calculates the locations of the object at multiple future times. In one example, the processor generates multiple scene descriptions that include probable locations of objects at different times starting from the timestamp of the sensor data. In another example, the perception module 402 (as shown in FIG. 4) determines, based on the sensor data and the timestamp, probable locations for the objects within the plurality of objects. In an embodiment, the perception module uses the locations of the objects and the velocities of the objects within the sensor data to calculate locations of each of the objects at a future time or a plurality of future times.

That data may be stored (e.g., in the database 410 as shown in FIG. 4) for future use in generating possible trajectories.

As shown in block 1420, the processor (e.g., the processor 146 as shown in FIG. 1) generates, while the vehicle is blocked and based on the probable locations of objects within the plurality of objects, one or more operational commands for the vehicle. For example, as described with respect to FIG. 1, the processor generates a trajectory based on desired destination. However, in this embodiment, the processor uses data for the probable location of the objects as calculated based on locations and velocities of the objects as indicated by the sensor data. Based on the calculated trajectory, the processor generates the operational commands in order to arrive at the desired location.

In an embodiment, the control module 406 (as shown in FIG. 4) generates the one or more operational commands. For example, the planning module receives input from the perception module 402 (as shown in FIG. 4) and the localization module 408 (as shown in FIG. 4). As described in connection with FIG. 4, in an embodiment the data includes the vehicle's position in relation to its environment and the trajectory for the vehicle's destination. In another embodiment, the control module 406 (as shown in FIG. 4) generates the one or more commands in accordance with the trajectory to arrive at the destination.

In an embodiment, the processor (e.g., the processor 146 as shown in FIG. 1) performs the following actions to generate the one or more operations commands. The processor generates a plurality of possible trajectories for the vehicle. For example, the processor may use map data in conjunction with the vehicle's location to generate one or more trajectories for the vehicle so that the vehicle can arrive at a destination. In another embodiment, the planning module 404 (as shown in FIG. 4) generates the trajectories. When the trajectories are generated, the processor (e.g., the processor 146 as shown in FIG. 1) iterates through the selected trajectories to perform the following actions. The processor 146 selects a first trajectory of the plurality of possible trajectories. In some instances, the trajectories are stored in one or more data structures in memory or storage (e.g., the memory 144 and/or storage 142 as shown in FIG. 1). In another embodiment, the planning module 404 (as shown in FIG. 4) iterates through the trajectories and selects the first trajectory to process.

The processor (e.g., the processor 146 as shown in FIG. 1) identifies, for the first trajectory, one or more objects of the plurality of objects that have been determined to interfere with the first trajectory. For example, the first trajectory may include a road with a pedestrian crossing. The processor may have determined that, based on the velocity of the pedestrian that the pedestrian will be in the pedestrian crossing at approximately the same time as the vehicle. In an embodiment, the planning module 404 (as shown in FIG. 4) makes this identification based on the data generated by the perception module 402 (as shown in FIG. 4). The data may be stored in the database 410.

In an embodiment, the processor (e.g., processor 146 as shown in FIG. 1) receives, one or more probabilities for the one or more objects. In an embodiment, the probabilities are stored in storage (e.g., the storage 142 as shown in FIG. 1) and retrieved into memory (e.g., the memory 144 as shown in FIG. 1). In another embodiment, in accordance with FIG. 4, the planning module 404 retrieves the probabilities from the database 410. The perception module 402 generate the probabilities that are retrieved by the planning module 404. In another embodiment instead of receiving the one or more probabilities the planning module 404 (as shown in FIG. 4) generates the probabilities on the fly. In yet another embodiment, the planning module 404 (as shown in FIG. 4) retrieves from the database 410 (as shown in FIG. 4) a location and a velocity for each object that has been determined to interfere with the trajectory of the vehicle. The planning module 404 (as shown in FIG. 4) may generate a probability for each of the objects of how likely the object is to interfere with the trajectory.

In an embodiment, each probability is generated based on time and location of the interfering object. For example, if based on the velocity and location of a given object, the processor (e.g., the processor 146 as shown in FIG. 1) determines that the object will cross the trajectory of the vehicle at the same time as the vehicle itself, the processor generates a very high probability that the object will interfere with the trajectory (e.g., 100% probability). As the time of the vehicle arriving at the point of the trajectory and the object arriving at the point of the trajectory increases, the probability is lowered accordingly. For example, if the difference in time is one minute, probability may be halved or set to another suitable value.

The processor (e.g., processor 146) determines whether any of the one or more probabilities meet a threshold. For example, the threshold may be set at fifty percent. Thus, if the probability of interference is fifty percent or above an action is taken, but if the probability is less than fifty percent no action is taken or a different action is taken. In an embodiment, the planning module 404 (as shown in FIG. 4) determines whether the threshold is met. In response to determining that any of the one or more probabilities meet the threshold, the processor (e.g., the processor 146 as shown in FIG. 1) removes the first trajectory from consideration for the vehicle's trajectory. In one embodiment, the processor (e.g., processor 146 as shown in FIG. 1) maintains a data structure of possible trajectories and removes those trajectories from the data structure that have been found to have objects that will interfere with those trajectories (e.g., with a specific probability value). When the processor identifies an appropriate trajectory (e.g., free from interference or where the probabilities of interference are below the threshold) the processor generates, based on that trajectory, the one or more operational commands for driving the vehicle. In an embodiment, those commands are generated by the planning module 404 (as shown in FIG. 4) and fed to the control module 406 (as shown in FIG. 4) for execution. In an embodiment, the planning module 404 transmits the appropriate trajectory to the control module 406 (as shown in FIG. 4) and the control module generates the operational commands.

To continue with FIG. 14, as shown in block 1425 the processor (e.g., the processor 146 as shown in FIG. 1) executes the one or more operational commands by a control circuit of the vehicle, where executing the operational commands includes maneuvering the vehicle along a path that is unblocked by the object. In another example, in according with FIG. 4, the control module 406 executes the operation commands as necessary.

Figure 15:
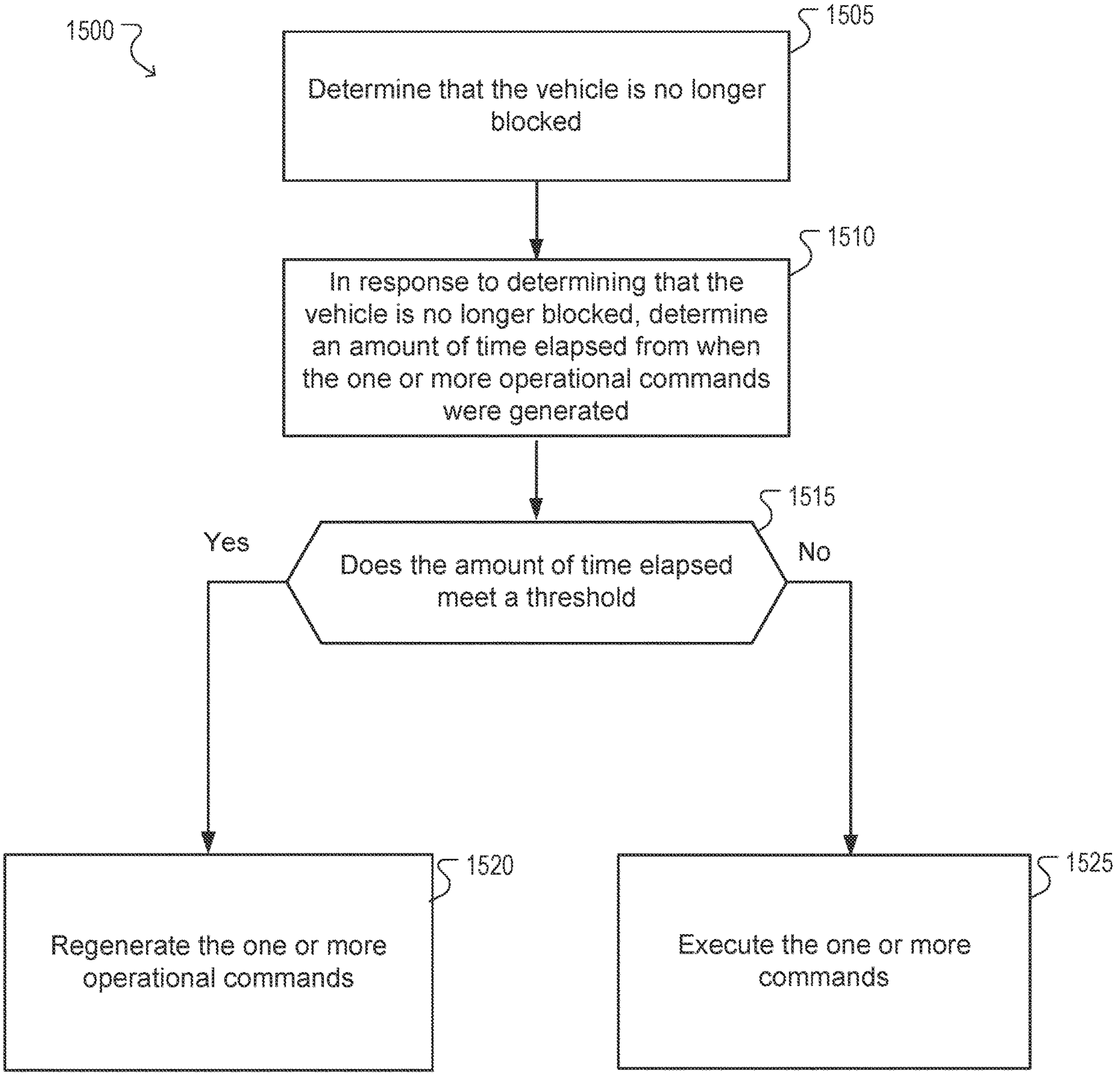
FIG. 15 illustrates a process for regenerating operational commands with updated data.

In an embodiment, when the vehicle becomes unblocked, the processor determines whether the operational commands have become stale and regenerates those commands with updated data. These actions are illustrated by a process 1500 of FIG. 15. Specifically, as shown in block 1505, the processor (e.g., the processor 146 as shown in FIG. 1) determines that the vehicle is no longer blocked. In an embodiment, the processor receives updated sensor data and determines, based on the updated sensor data, that the blocking object has moved. As shown in block 1510, in response to determining that the vehicle is no longer blocked, the processor (e.g., the processor 146 as shown in FIG. 1) determines an amount of time elapsed from when the one or more operational commands were generated. For example, when the one or more operational commands are created a timestamp is generated for the creation time. The processor compares the current time with the timestamp to determine the elapsed amount of time. This action may also be performed, as illustrated in FIG. 4, by the planning module 404 and/or the control module 406, or another suitable component.

As shown in block 1515, the processor uses the timestamp and determines whether the amount of time elapsed meets a threshold. In an embodiment, a threshold is to ten seconds and stored in memory (e.g., the memory 144 as shown in FIG. 1) or in storage (e.g., the storage 142 as shown in FIG. 1). The processor retrieves the threshold to compare with the timestamp. As shown in block 1520, in response to determining that the amount of time elapsed meets the threshold, the processor regenerates the one or more operational commands. To continue with the above example, if the vehicle is not unblocked in ten seconds the commands are regenerated. In an embodiment, the trajectory is also recalculated. These actions can also be performed, as illustrated in FIG. 4, by the planning module 404 and/or the control module 406, or another suitable component. In an embodiment, as illustrated in block 1525 when the amount of time does not meet the threshold, the one or more commands are executed without an update.

In an embodiment the operational commands are executed in response to determining that the vehicle is no longer blocked. Specifically, the processor (e.g., the processor 146 as shown in FIG. 1) receives updated sensor data. For example, the processor receives updated sensor data at a specific interval (e.g., every ten seconds or another suitable interval). The processor determines, based on the updated sensor data, that the vehicle is no longer blocked. In an embodiment, the processor 146 (as shown in FIG. 1) receives radar, Lidar, and/or camera data, and determine based on that data that the blocking object is no longer blocking the vehicle. In response to determining that the vehicle is no longer blocked, the processor (e.g., the processor 146 as shown in FIG. 1) executes the one or more operational commands. In an embodiment, as illustrated in FIG. 4, the perception module 402 determines that the vehicle is no longer blocked and communicates that information to the planning module 404 which in turn communicated that information to the control module 406 to proceed with executing the operational commands.

In an embodiment, the operational commands are refreshed periodically. Specifically, the processor (e.g., the processor 146 as shown in FIG. 1) determines, prior to the vehicle being unblocked, that a threshold amount of time has passed from a time when the one or more operational commands for the vehicle were generated. For example, the operational commands are refreshed every ten seconds, thirty seconds one minute, or at another suitable interval. Thus, when that time interval passes the processor receives updated sensor data (e.g., retrieves from storage 142 and/or memory 144 as shown in FIG. 1), and updates the one or more operational commands based on the updated sensor data. In an embodiment, the update includes changing the trajectory and the driving commands based on different objects changing velocity and/or location. In some embodiments, the trajectory is also recalculated. These actions can also be performed, as illustrated in FIG. 4, by the planning module 404 and/or the control module 406, or another suitable component.

In an embodiment, the processor (e.g., the processor 146 as shown in FIG. 1) assigns, to the plurality of objects, a plurality of probabilities each probability indicating how likely a corresponding object is to interfere with the vehicle's trajectory, where each probability is based on location and velocity of a corresponding object. As discussed above, each probability may be calculated based on corresponding object's location and velocity as detected by sensors. In an embodiment, the probabilities are updated when new sensor data is available. Specifically, the processor (e.g., the processor 146 as shown in FIG. 1) receives updated sensor data, where the updated sensor data includes updated locations and updated velocities of one or more objects of the plurality of objects, and updates the plurality of probabilities based on the updated sensor data. For example, if sensor data is updated every second, every ten seconds, every minute, or at another suitable interval, the processor updates the probabilities at the same interval.

Partial Trajectory Update

Figure 16:
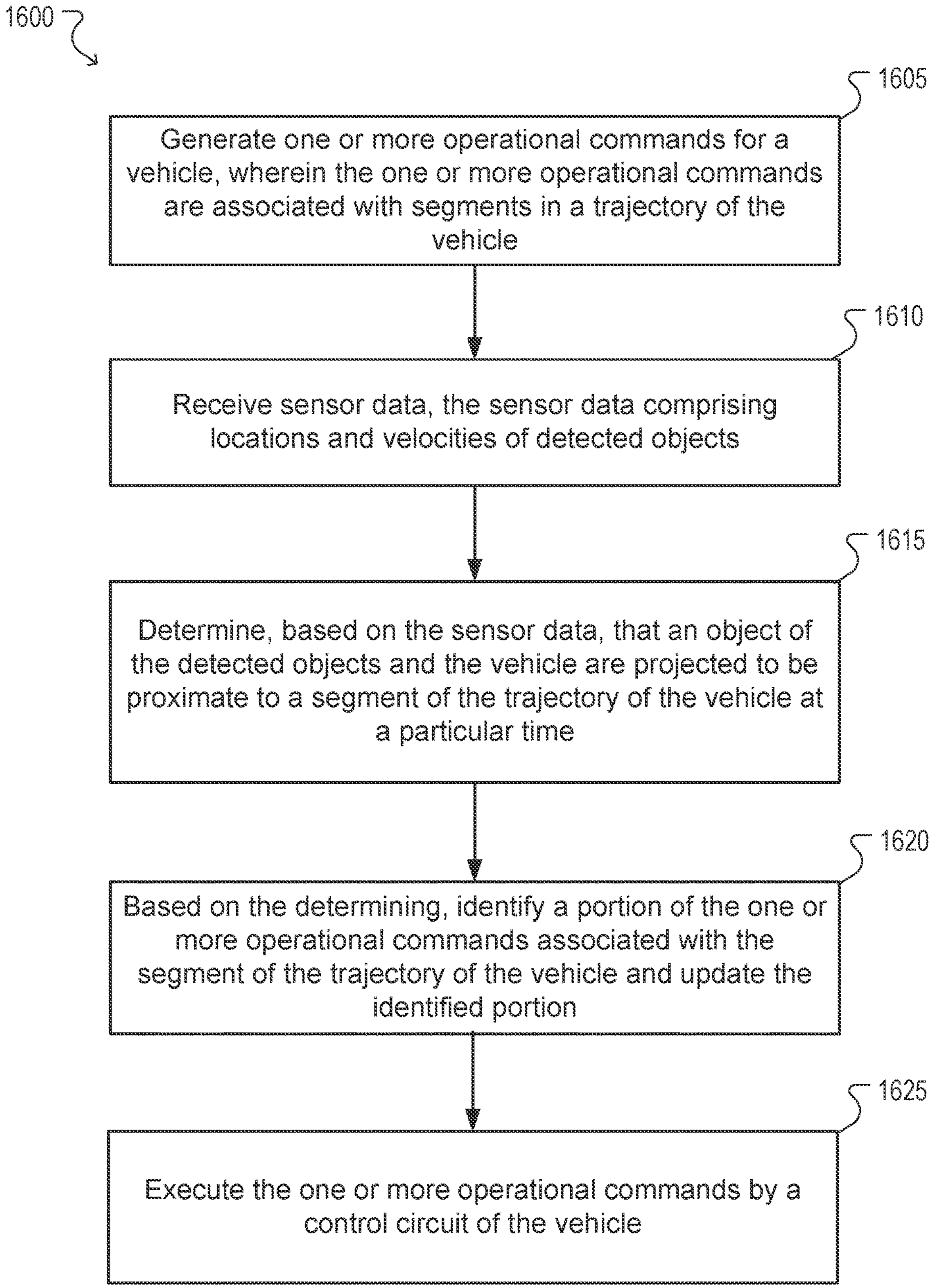
FIG. 16 illustrates updating a portion of a trajectory of a vehicle based on a probability that an object will cross a segment of that trajectory.

Techniques are provided for updating a portion of a driving trajectory of a vehicle based on a probability that an object will cross a segment of the current driving trajectory at a later point, without recalculating the whole trajectory. FIG. 16 illustrates a process 1600 for updating a portion of a driving trajectory of a vehicle based on a probability that an object will cross a segment of the current driving trajectory. As shown in block 1605, a processor (e.g., the processor 146 as shown in FIG. 1) generates one or more operational commands for a vehicle, where the one or more operational commands are associated with segments in a trajectory of the vehicle. In an embodiment, when the vehicle receives input for a destination, the processor generates one or more operational commands for getting the vehicle to the destination. In another embodiment, as illustrated in FIG. 4, the planning module 404 and/or the control module 406 generates the operational commands based on object information generated by the perception module 402.

As shown in block 1610, the processor (e.g., the processor 146 as shown in FIG. 1) receives sensor data, the sensor data including locations and velocities of detected objects. In one embodiment, sensors 121, 122, and 123 collect various data about the environment of the vehicle. That collected sensor data is received by the processor. In an embodiment, as illustrated in FIG. 4 sensor data is stored in the database 410 and processed by the perception module 402. The planning module 404, receives the processed sensor data. The perception module 402 processes the sensor data to label various objects in the vehicle's environment, as discussed above in relation to FIG. 4.

As shown in block 1615, processor (e.g., the processor 146 as shown in FIG. 1) determines, based on the sensor data, that an object of the detected objects and the vehicle are projected to be proximate to a segment of the trajectory of the vehicle at a particular time. In an embodiment, processor 146 accesses the data indicating the trajectory of the vehicle and determines specific times when the vehicle will be traveling through the segments of the trajectory. The processor compares the data indicating the trajectory of the vehicle with data for the objects detected in the environment. In an embodiment, each object in the environment is stored as a data structure that includes the objects location and trajectory. In another embodiment, other information about each object is stored in a corresponding data structure. That information may include a time when the object will reach each segment of the trajectory. In an embodiment, the processor (e.g., the processor 146 as shown in FIG. 1) determines, based on comparing object data and vehicle trajectory data, whether any of the detected objects will be proximate to the trajectory and also determine whether the object will be proximate to the trajectory at a substantially similar time interval (time frame). In another embodiment, as illustrated in FIG. 4, the planning module 404 and/or the control module 406 performs the calculations described in relation to determining that an object of the detected objects and the vehicle are projected to be proximate to a segment of the trajectory of the vehicle at a particular time.

In an embodiment, an object does not necessarily need to cross the trajectory of the vehicle, but has to be proximate to the vehicle because the trajectory of the object is approximated based on known information about the object (e.g., velocity and staring location). Therefore, it is possible that the vehicle may collide with the object even if the two trajectories do not cross each other, but are merely close to each other. In order to avoid a possible collision action is taken in these situations (i.e., where the trajectories for the object and the vehicle do not cross by are close to each other). In an embodiment, the times when the vehicle and any object are determined to be proximate to each other do not have to be the same. It is enough that the times of when the object and the vehicle are proximate to each other are close (e.g., within ten seconds, thirty seconds, one minute, or another suitable value). In order to avoid a possible collision, action must be taken when the times are close.

As shown in block 1620, the processor (e.g., the processor 146 as shown in FIG. 1), based on the determining (i.e., based on determining that an object of the detected objects and the vehicle are projected to be proximate to a segment of the trajectory of the vehicle at a particular time), identifies a portion of the one or more operational commands associated with the segment of the trajectory of the vehicle and updates the identified portion. In one embodiment, the operational commands are stored in a data structure of a corresponding segment and the identified portion includes one or more segments that need to be updated. When the processor identifies a segment that is determined to need an update to the operational commands, the processor may retrieve the commands and update those commands for the segment.

Figure 17:
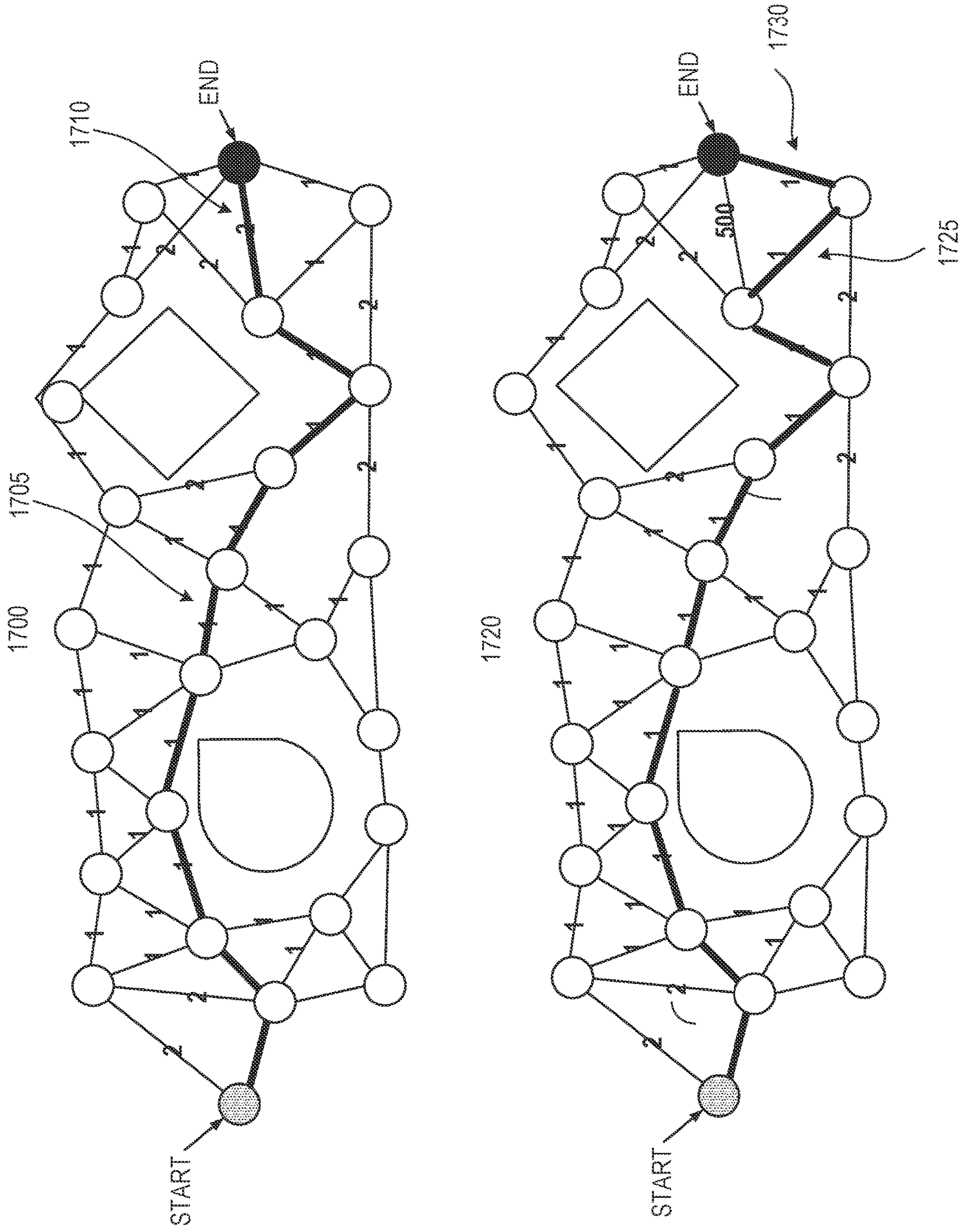
FIG. 17 illustrates an update to a driving trajectory where operational commands for a segment are updated with different operational commands

FIG. 17 illustrates an update to a driving trajectory where operational commands for a segment are updated with different operational commands. In this case, illustration 1700 shows multiple possible trajectories for a vehicle to travel from a start point to a destination. Trajectory 1705 has been selected (e.g., by the processor 146 as shown in FIG. 1) to get from the start point to the end point. As the process 1600 proceeds to block 1615 where the processor determines that a specific segment in the trajectory is proximate to an object at a particular time, the processor identifies segment 1710 as the segment that needs an update. An illustration 1720 shows an updated trajectory of the vehicle where based on the process 1600, the processor has updated operational commands for the trajectory to not traverse segment 1710, but instead to traverse segments 1725 and 1730. In an embodiment, the operational commands are updated to traverse one segment instead of the identified segment and in another embodiment, the operational commands are updated to traverse several segments instead. In an embodiment, as illustrated in FIG. 4, the planning module 404 and/or the control module 406 performs the calculations and operational command updates. As shown in block 1625, the processor (e.g., the processor 146 as shown in FIG. 1 or another suitable control circuit) executes the one or more operational commands to get the vehicle to its destination.

In an embodiment, the processor (e.g., the processor 146 as shown in FIG. 1) determines that an object and a vehicle are projected to be proximate to the segment of the trajectory of the vehicle at the particular time by taking the following actions. The processor generates, based on velocity and location of the object, a trajectory for the object. For example, the processor generates a model for the object's movement based on speed, direction and original location. That model is stored in a data structure to be referenced at a later time. With the trajectory information on the object and the vehicle's trajectory information, the processor determines whether the object and the vehicle will be proximate to each other at the particular time. The processor compares coordinate information (e.g., GPS coordinates) for the trajectory of the vehicle and the trajectory of the object. If the coordinates are within a threshold distance (e.g., within a foot, a yard, or another suitable distance), the processor determines (e.g., based on the velocity of the object and the velocity of the vehicle) a time when the object and the vehicle reach the coordinates that is within the threshold. If the time is within the threshold time, the processor determined that the object will be proximate to the vehicle at a specific time (i.e., there is a possibility of collision).

In response to determining that the object of the detected objects and the vehicle will be proximate to each other, the processor (e.g., the processor 146 as shown in FIG. 1) identifies a segment of the trajectory of the vehicle that will be proximate to the object of the detected objects. In an embodiment, the processor iterates through a data structure that stores segment identifiers and the corresponding operational commands. The processor compares object coordinates that are closest to the trajectory with coordinates associated with each segment of the vehicle's trajectory and identifies the segment that has the coordinates that match the coordinates associated with the object. In another embodiment, coordinates match when they are within a threshold distance. In another example, as illustrated in FIG. 4, the planning module 404 and/or the control module 406 perform the actions described in relation to determining that an object and a vehicle are projected to be proximate to the segment of the trajectory of the vehicle at the particular time.

In an embodiment, determining, based on the trajectory of the vehicle and the trajectory of the object, whether the object and the vehicle will be proximate to each other at the particular time includes the following actions. A processor (e.g., the processor 146 as shown in FIG. 1) identifies, at the particular time, a segment of the trajectory of the object closest to the segment of the trajectory of the vehicle. As described above, the processor compares coordinates associated with the trajectory of the object with each of a plurality of coordinates associated with the trajectory of the vehicle. Based on both sets of coordinates, the processor determines which segment of the vehicle's trajectory will be proximate to the object at a particular time. The processor determines whether a distance between the segment of the trajectory of the object and the segment of the trajectory of the vehicle is below a threshold. In an embodiment, the processor determines that the vehicle and the object will be within half a meter from each other. In response to determining that the distance is below a threshold, the processor (e.g., the processor 146 as shown in FIG. 1) determines that the vehicle will be proximate to the object at the particular time. In another embodiment, as illustrated in FIG. 4, the planning module 404 and/or the control module 406 performs these actions.

In an embodiment, the processor (e.g., the processor 146 as shown in FIG. 1) refrains from updating operational commands that are not associated with the segment of the trajectory. For example, the processor updates the operational commands associated with the specific segment without updating operational commands of other segments. In an embodiment, the processor updates operational commands of segments surrounding the newly-updated segment in order to get the car navigated properly to the updated segment and to the segment after the updated segment.

In an embodiment, the processor (e.g., the processor 146 as shown in FIG. 1) generates a corresponding data structure for each segment of the trajectory of the vehicle, and associates the portion of the one or more operational commands with a data structure that corresponds to the segment of the trajectory of the vehicle. For example, the processor generates a linked list for the trajectory (whether for the vehicle's trajectory or the object's trajectory). The linked list may include linked objects with properties including speed, direction, original location (when the segment starts), projected location (when the segment ends), and other suitable information. Each segment of the trajectory may correspond to a linked object.

In an embodiment, when identifying a portion of the one or more operational commands associated with a segment of the trajectory of the vehicle and updating the identified portion, the processor (e.g., the processor 146 as shown in FIG. 1) performs the following actions. The processor accesses a data structure that corresponds to the segment of the trajectory of the vehicle, and retrieves from the data structure, the one or more operational commands. For example, the processor accesses the data structure from memory 144 and/or storage 142 (as shown in FIG. 1) and retrieves the currently stored operational commands from the data structure. In another example, as illustrated in FIG. 4, the data structure resides in the database 410 and the planning module 404 and/or the control module B016 retrieves the operational commands from the database.

In an embodiment, it may be useful to gather more data before updating the operational commands associated with the segment. For example, there may not be a good alternate set commands to avoid a collision. Thus, the processor (e.g., the processor 146 as shown in FIG. 1) modifies the speed of the vehicle to a negligible magnitude. For example, the vehicle may be moving on its trajectory and has stopped at a traffic light. After the traffic light allows the vehicle to proceed, the vehicle, instead of accelerating to a pre-planned speed, instead accelerates to a negligible or small speed (e.g., 3 mph) in order to collect more data.

The processor receives updated sensor data, the updated sensor data including updated locations and updated velocities of detected objects, and generates, based on the updated sensor data, a corresponding probability for each object. In an embodiment, each probability indicates how likely a corresponding object is to be proximate to the trajectory of the vehicle, based on a location and a velocity of a corresponding object. For example, the probability may be calculated based on time. Specifically, if the object and the vehicle are determined to be proximate to each other at the same time, then the probability is set to a very high value (e.g., 95%). However, if it is determined that the object and the vehicle will be proximate to each other ten minutes apart, then the probability is set at a very low number (e.g., 5%). In an embodiment, the probability is decreases as the time interval between the vehicle and the object being at a proximate location increases. In one embodiment, the probability is based on distance. For example the probability decreases as the distance between the location of the vehicle and location of the object increases. Specifically, if the vehicle and the object are determined to be at the same point, the probability is set to a high number. However, if the vehicle and the object are determined to be fifty feet apart, the probability is set to a low number. In an embodiment, the probability is calculated as a combination of both distance and time. That is, probability is lowered if one or more of a distance and a time are increased.

ADDITIONAL EMBODIMENTS

In an embodiment, one or more operational commands are generated for a vehicle. The one or more operational commands are associated with segments in a trajectory of the vehicle. Sensor data is received including locations and velocities of detected objects. Based on the sensor data, it is determined that an object of the detected objects and the vehicle are projected to be proximate to a segment of the trajectory of the vehicle at a particular time. Based on the determining, a portion of the one or more operational commands associated with the segment of the trajectory of the vehicle is identified. The identified portion is updated. The one or more operational commands are executed by a control circuit of the vehicle.

In an embodiment, the determining that the object of the detected objects and the vehicle are projected to be proximate to the segment of the trajectory of the vehicle at the particular time includes generating, based on velocity and location of the object of the detected objects, a trajectory of the object. It is determined, based on the trajectory of the vehicle and the trajectory of the object of the detected objects, whether the object of the detected objects and the vehicle will be proximate to each other at the particular time. In response to determining that the object of the detected objects and the vehicle will be proximate to each other, a segment of the trajectory of the vehicle is identified. The trajectory will be proximate to the object of the detected objects.

In an embodiment, the determining, based on the trajectory of the vehicle and the trajectory of the object, whether the object and the vehicle will be proximate to each other at the particular time includes identifying, at the particular time, a segment of the trajectory of the object closest to the segment of the trajectory of the vehicle. It is determined whether a distance between the segment of the trajectory of the object and the segment of the trajectory of the vehicle is below a threshold. In response to determining that the distance is below a threshold, it is determined that the vehicle will be proximate to the object at the particular time.

In an embodiment, updating operational commands that are not associated with the segment of the trajectory is refrained from.

In an embodiment, a corresponding data structure for each segment of the trajectory of the vehicle is generated. The portion of the one or more operational commands is associated with a data structure that corresponds to the segment of the trajectory of the vehicle.

In an embodiment, the identifying of the portion of the one or more operational commands associated with the segment of the trajectory of the vehicle and updating the identified portion includes accessing the data structure that corresponds to the segment of the trajectory of the vehicle. From the data structure, the one or more operational commands are received.

In an embodiment, the speed of the vehicle is modified to a negligible magnitude. Updated sensor data is received. The updated sensor data includes updated locations and updated velocities of detected objects. Based on the updated sensor data, a corresponding probability for each object is generated. Each probability indicates how likely a corresponding object is to be proximate to the trajectory of the vehicle. Each probability is based on a location and a velocity of a corresponding object.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:

determining, with at least one processor and based on sensor data, that an object and a vehicle are projected to be proximate to a particular segment of a trajectory of the vehicle at a particular time;

identifying a portion of the one or more operational commands associated with the particular segment of the trajectory of the vehicle;

determining, with the at least one processor, whether there is an alternate set of operational commands that could avoid collision of the vehicle with the object in the particular segment;

in a case where there is an alternate set of operational commands that could avoid collision of the vehicle with the object: updating the identified portion of the one or more operational commands with the alternate set of operational commands; and executing, with a control circuit of the vehicle, the updated identified portion of the one or more operational commands;

in a case where there is not an alternate set of operational commands that could avoid collision of the vehicle with the object:

modifying the speed of the vehicle to a specified magnitude;

receiving updated sensor data, where the updated sensor data includes an updated location and velocity of the object;

generating the alternative set of operational commands based on the updated sensor data;

updating the identified portion of the one or more operational commands based on the generated alternate set of operational commands; and executing, with the control circuit of the vehicle, the updated identified portion of the one or more updated operational commands.

2. The method of claim 1, wherein determining that the object and the vehicle are projected to be proximate to the segment of the trajectory of the vehicle at the particular time, further comprises:

generating, based on the velocity and location of the object, a trajectory of the object;

determining, based on the trajectory of the vehicle and the trajectory of the object, whether the object and the vehicle will be proximate to each other at the particular time; and responsive to determining that the object and the vehicle will be proximate to each other at the particular time, identifying a segment of the trajectory of the vehicle where the trajectory will be proximate to the object.

3. The method of claim 1, wherein determining that the object and the vehicle will be proximate to each other at the particular time further comprises:

identifying, at the particular time, a segment of the trajectory of the object closest to the segment of the trajectory of the vehicle;

determining whether a distance between the segment of the trajectory of the object and the segment of the trajectory of the vehicle is below a threshold; and responsive to determining that the distance is below a threshold, determining that the vehicle will be proximate to the object at the particular time.

4. The method of claim 3, further comprising:

identifying a portion of the one or more operational commands associated with the segment of the trajectory of the vehicle; and updating the identified portion of the one or more operational commands.

5. The method of claim 4, wherein the one or more operational commands are stored in a data structure corresponding to the segment of the trajectory of the vehicle.

6. The method of claim 1, wherein prior to updating the one or more operational commands, the method further comprises:

generating a probability for the object, wherein the probability indicates how likely the object is to be proximate to the trajectory of the vehicle.

7. The method of claim 6, wherein the probability decreases as a time interval between the vehicle and the object being at a proximate location increases.

8. The method of claim 6, wherein the probability decreases as a distance between the location of the vehicle and the location of the object increases.

9. A vehicle comprising:

one or more processors; and a non-transitory computer-readable storage medium storing one or more programs for execution by the one or more processors, the one or more programs including instructions which, when executed by the one or more processors, cause the one or more processors to:

determine, based on sensor data, that an object and a vehicle are projected to be proximate to a particular segment of a trajectory of the vehicle at a particular time;

identify a portion of the one or more operational commands associated with the particular segment of the trajectory of the vehicle;

determine whether there is an alternate set of operational commands that could avoid collision of the vehicle with the object in the particular segment;

in a case where there is an alternate set of operational commands that could avoid collision of the vehicle with the object:

update the identified portion of the one or more operational commands with the alternate set of operational commands; and execute, with a control circuit of the vehicle, the updated identified portion of the one or more operational commands;

in a case where there is not an alternate set of operational commands that could avoid collision of the vehicle with the object:

modify the speed of the vehicle to a specified magnitude;

receive updated sensor data, where the updated sensor data includes an updated location and velocity of the object;

generate the alternative set of operational commands based on the updated sensor data;

update the identified portion of the one or more operational commands based on the generated alternate set of operational commands; and execute, with the control circuit of the vehicle, the updated identified portion of the one or more updated operational commands.

10. The vehicle of claim 9, wherein determining that the object and the vehicle are projected to be proximate to the segment of the trajectory of the vehicle at the particular time further comprises:

generating, based on the velocity and location of the object, a trajectory of the object;

determining, based on the trajectory of the vehicle and the trajectory of the object, whether the object and the vehicle will be proximate to each other at the particular time; and responsive to determining that the object and the vehicle will be proximate to each other at the particular time, identifying a segment of the trajectory of the vehicle where the trajectory will be proximate to the object.

11. The vehicle of claim 9, wherein determining, based on the trajectory of the vehicle and a trajectory of the object, that the object and the vehicle will be proximate to each other at the particular time further comprises:

identifying, at the particular time, a segment of the trajectory of the object closest to the segment of the trajectory of the vehicle;

determining whether a distance between the segment of the trajectory of the object and the segment of the trajectory of the vehicle is below a threshold; and responsive to determining that the distance is below a threshold, determining that the vehicle will be proximate to the object at the particular time.

12. The vehicle of claim 11, wherein the instructions further cause the one or more processors to:

identify a portion of the one or more operational commands associated with the segment of the trajectory of the vehicle; and update the identified portion of the one or more operational commands.

13. The vehicle of claim 12, wherein the one or more operational commands are stored in a data structure corresponding to the segment of the trajectory of the vehicle.

14. The vehicle of claim 9, wherein prior to updating the one or more operational commands, the instructions further cause the one or more processors to:

generate a corresponding probability for the object, wherein each probability indicates how likely the object is to be proximate to the trajectory of the vehicle.

15. The vehicle of claim 14, wherein the probability decreases as a time interval between the vehicle and the object being at a proximate location increases.

16. The vehicle of claim 14, wherein the probability decreases as a distance between the location of the vehicle and the location of the object increases.

* * * * *